United States Patent
Bickert et al.

(10) Patent No.: US 6,606,150 B2
(45) Date of Patent: Aug. 12, 2003

(54) INSPECTION MODULE FOR INSPECTING OPTICAL PARTS FOR FAULTS

(75) Inventors: Stefan Bickert, Überlingen (DE); Roland Hauck, Hohenfels-Deutwang (DE); Olaf Rothe, Uhldingen/Mühlhofen (DE); Roland Seibert, Hohenfels (DE); Hans Wörner, Überlingen (DE); Peter Hagmann, Erlenbach am Main (DE); Roger Biel, Frankfurt am Main (DE)

(73) Assignee: Novartis AG, Basel (CH)

( * ) Notice: Subject to any disclaimer, the term of this patent is extended or adjusted under 35 U.S.C. 154(b) by 117 days.

(21) Appl. No.: 09/784,455

(22) Filed: Feb. 15, 2001

(65) Prior Publication Data

US 2002/0009217 A1 Jan. 24, 2002

Related U.S. Application Data

(63) Continuation of application No. PCT/EP99/05935, filed on Aug. 13, 1999.

(51) Int. Cl.[7] ................................................ G01B 9/00
(52) U.S. Cl. ...................... 356/124; 206/5.1; 356/239.2
(58) Field of Search ................................ 356/124–127, 356/239.1, 240.1, 239.2; 206/5.1

(56) References Cited

U.S. PATENT DOCUMENTS

| | | | |
|---|---|---|---|
| 4,623,249 A | 11/1986 | Grant | 356/124 |
| 4,736,130 A * | 4/1988 | Puskas | 73/647 |
| 5,086,397 A * | 2/1992 | Schuster et al. | 700/110 |
| 5,099,987 A | 3/1992 | Bieri | 206/5.1 |
| 5,745,230 A | 4/1998 | Edwards et al. | 356/124 |
| 5,812,254 A * | 9/1998 | Ebel et al. | 356/124 |

FOREIGN PATENT DOCUMENTS

EP  0491 663 A1  6/1992

\* cited by examiner

*Primary Examiner*—F. L. Evans
*Assistant Examiner*—Kara Geisel
(74) *Attorney, Agent, or Firm*—Jian S. Zhou; Robert Gorman; Richard I. Gearhart

(57) ABSTRACT

In an inspection module for inspecting optical parts (12) for defects, especially contact lenses manufactured as injection-moulded parts, the optical parts (12) are illuminated from one side and are observed from the opposite side by means of an image-resolving sensor (34). The image data of the sensor (34) are forwarded to image-processing means for identification of defects. To obtain a high throughput with a simple construction, a chain (52) of liquid-filled vessels (10) circulating in an endless line is provided. The endless line is passed in an inspection station (72) between an illumination device (32) and the image-resolving sensor (34). Handling means in the form of grippers (56, 58) revolve with the vessels (10), by means of which optical parts (12) to be inspected can be introduced into the vessels (10) at a position of the line upstream of the inspection station (72) and the inspected parts can be taken out of the vessels (10) at another position of the line.

20 Claims, 3 Drawing Sheets

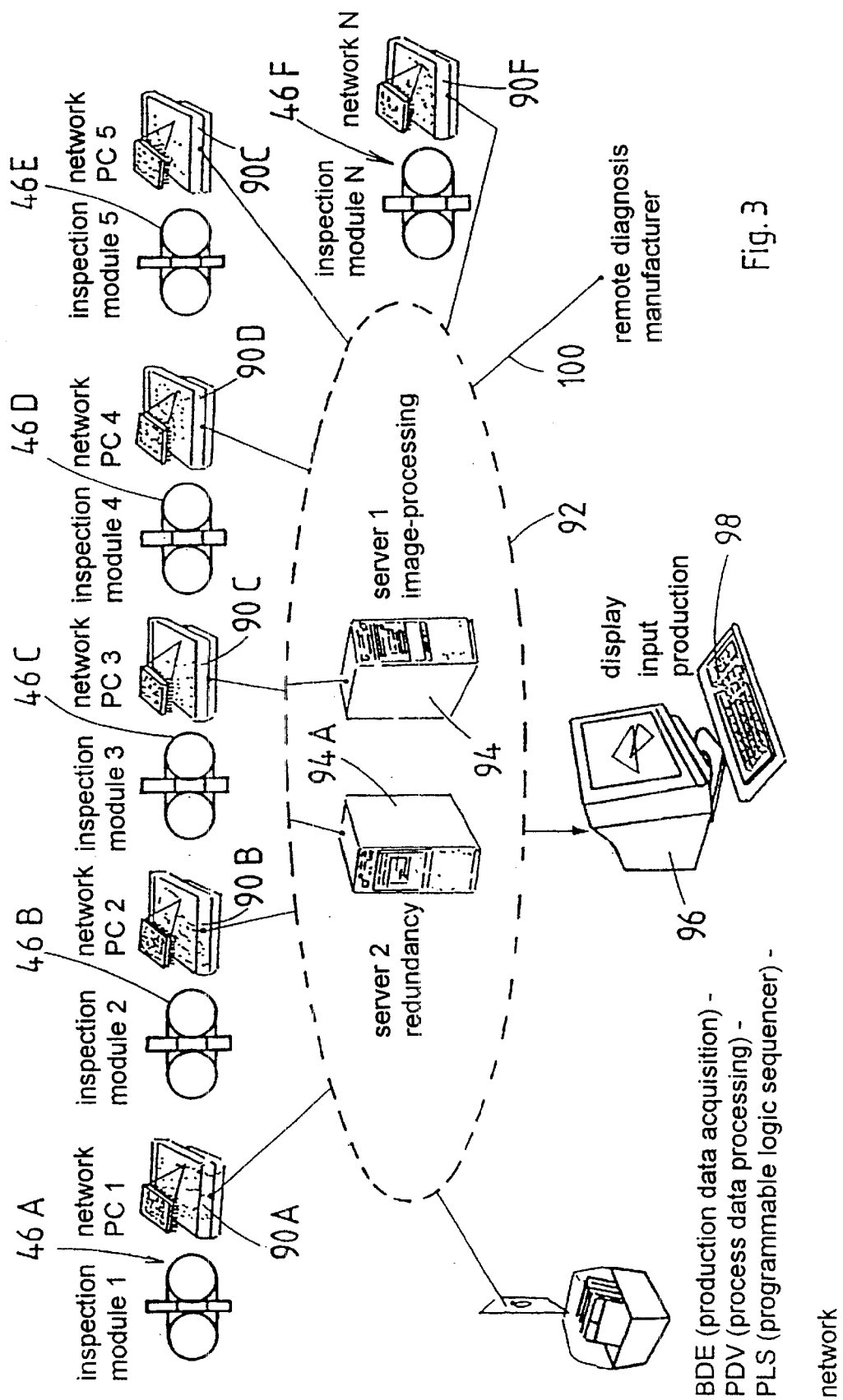

INSPECTION MODULE FOR INSPECTING OPTICAL PARTS FOR FAULTS

This application is a continuation of International Application No. PCT/EP99/05935, filed Aug. 13, 1999, which claims the benefit 35 USC §119 of European patent application No. EP 98250293.2 filed on Aug. 17, 1998, the contents of which are incorporated herein by reference.

The invention relates to an inspection module for inspecting optical parts for defects.

Series-produced optical parts, for example contact lenses, have to be inspected for defects such as scratches, voids or broken edges. For that purpose it is known to illuminate the optical parts in transmitted light and observe them by means of an image-resolving sensor. Defects, which result in a refraction or scattering of the light, then appear dark. The image data provided by the image-resolving sensor are evaluated by image-processing means. The parts identified as being defective are subsequently rejected.

The problem is that the parts are obtained in production in rapid succession. An inspection module must therefore allow a high throughput. Known inspection apparatuses are relatively slow, and therefore the throughput is severely limited. Furthermore, known inspection apparatuses are of complicated construction.

The problem underlying the invention is to construct an inspection module of the kind mentioned at the beginning, using simple means, in such a manner that a high throughput of optical parts to be inspected is made possible.

The invention is to provide an inspection module which can be used in inspecting of optical parts for defects in a high throughput manner. Other objects, advantages, and features of the present invention will become apparent after review of the descriptions hereinafter and the Claims.

For inspection, the parts to be inspected, for example contact lenses, are introduced into a transport vessel which is filled with liquid, since they are in a stress-free state when in liquid. The test specimen sinks in the transport vessel softly to the bottom. The vessel can be of such a shape that the part adopts a substantially defined position on the bottom. According to the invention, when the transport vessels pass through the inspection station they are closed by transparent lids the inside of which—at least in the region of the inspection light beam—is wetted by the liquid. Since illumination takes place through the transparent lid, wetting of the lid ensures that variations in the surface of the liquid, such as, for example, waves caused by the movement of the transport vessels, which can impair the measurement, do not occur. That construction of the transport vessels makes it possible for the optical inspection of a contact lens to be carried out directly in the transport vessel and obviates the need for separate process steps. Owing to the simultaneous transport of the contact lenses in the transport vessels and inspection of the contact lenses inside the vessels, a rapid throughput of contact lenses to be inspected is made possible, and efficient and economical inspection is ensured. Since the transport vessels are closed by a lid during the inspection, external influences such as the wave motion of the liquid can be excluded and reproducible measurement is made possible with every vessel in the line. After being inspected, the inspected optical part is taken out of the liquid again and transported away as "good" or "defective". According to the invention, the vessel is conveyed through the inspection station along an endless line, thus making it possible to guide each vessel simply and inexpensively. Since a handling means furthermore runs synchronously with each vessel, a sufficient period of time is available for each individual handling step, so that, despite a high throughput, reliable inspection of the contact lenses is achieved.

Altogether, an inspection module that is simple in construction and in terms of guidance is provided by the invention, since the transport vessels are themselves already equipped with optical properties for the inspection of the optical parts and the expenditure for guiding the individual transport vessels is minimised by arranging them along an endless line.

The vessels can be constructed prismatically with a bottom consisting of transparent material and can be closable by the transparent lid at their open end. The vessels are then illuminated at the inspection station from the lid end and are observed by means of the sensor through the bottom. The prismatic shape of the vessels which is adapted to the dimensions of the optical parts to be inspected ensures that the parts to be inspected sink in the liquid to the bottom in a defined manner and adopt there a defined position.

The optical part to be inspected lying on the inside of the bottom is imaged onto the image-resolving sensor by imaging optical means having a range of sharpness that covers the optical part to be inspected. The thickness of the bottom and the distance between bottom and lid are selected to be sufficiently large that the lid in the same way as the outside of the bottom lies outside the range of sharpness of the imaging optical means. The lid and the outside of the bottom may themselves bear scratches or the like owing to handling of the vessels. Those surfaces, however, are outside the range of sharpness of the imaging of the optical part onto the sensor. Scratches, dust or other defects on the lid or the outside are therefore not "seen" sharply by the sensor and cannot produce an illusion of defects in the optical part to be inspected.

When the optical part to be inspected is introduced into the liquid, bubbles which would produce an illusion of defects in the optical part to be inspected may become attached to the part. In an advantageous development of the invention, the inspection module has means for removing bubbles from the liquid before the measurement. The bubble-removing means may operate, for example, with ultrasound.

In a preferred embodiment of the inspection module according to the invention, the endless line is formed by a chain of vessels that is passed around a first and a second turntable having parallel axes of rotation extending at a distance from each other. First handling means for introducing the optical parts to be inspected and for carrying out the inspection revolve with the first turntable, and second handling means for taking out the inspected optical parts revolve with the second turntable. The first handling means can comprise a gripper for placing a lid on the vessel after introduction of the optical part to be inspected and for removing the lid after the inspection. The second handling means can comprise a gripper that, in an entry region of the second turntable, is immersible in the liquid and grasps the optical part and that, in an exit region of the second turntable, is movable out of the liquid together with the optical part. Between the entry region and the exit region of the second turntable, a liquid-exchange region can be provided in which the liquid is removed from the vessels by suction and replaced by new liquid. Conveying means for supplying parts to be inspected and for removing inspected parts, which means run at right angles to the direction of movement of the chain of vessels, can be arranged between the turntables. The handling means can be guided along the endless line by fixed cams past which the handling means run. The liquid-filled vessels can be driven continuously. Cam guidance of that kind is simple to implement. The toothing of the individual vessels provides a fixed coupling, so that altogether the expenditure on guidance is minimised.

Furthermore, the first handling means simply revolve with the first turntable, and the second handling means with the second. Separate synchronisation is therefore unnecessary. Even when the chain of vessels and the turntables are running relatively quickly to obtain a high throughput, there is sufficient time for the various functions of the handling means. The handling means therefore need to move only relatively slowly. That makes it possible to guide the handling means, for example the lifting of grippers, simply by means of fixed cams past which the handling means run together with the chain of vessels. Owing to the simultaneous running of the handling means, driving of the chain of vessels also can be carried out continuously at a constant speed, that is to say not step-wise. That too results in a simplification.

Altogether, the inspection modules constructed in that manner are comparatively small, simple and inexpensive. It is therefore possible to construct an inspection apparatus for inspecting optical parts for defects, especially contact lenses manufactured as injection-moulded parts, in such a manner that a plurality of inspection modules of the above-mentioned kind are each connected by a respective computer to a common server. If one inspection module fails, the entire inspection capacity is not then lost, which would necessarily lead to a stop in production, but a high percentage, for example 80%, of the inspection capacity is maintained.

An illustrative embodiment of the invention is described in detail below with reference to the accompanying drawings, in which:

FIG. 3 is a schematic view of an inspection apparatus composed of a plurality of inspection modules according to FIG. 2.

Figure 1:
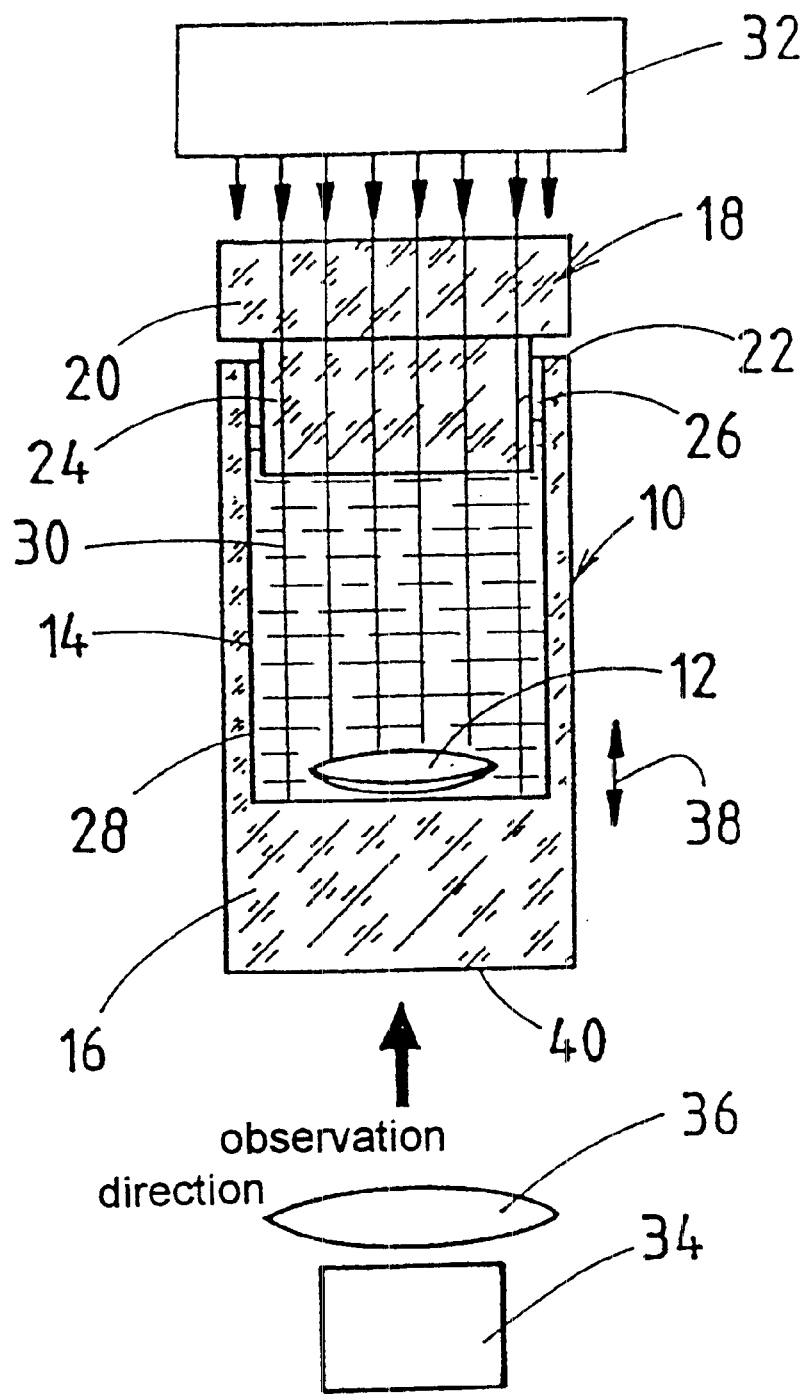
FIG. 1 is a schematic view of a vessel filled with liquid, with a transparent lid and a contact lens to be inspected.

In FIG. 1, reference numeral 10 denotes a vessel in which a contact lens 12, which has been manufactured as an injection-moulded part, is to be inspected for defects such as scratches, voids or the like. The vessel 10 has a prismatic basic shape, specifically a cylindrical basic shape here. Spaced away from the inside wall 14 of the vessel 10, the contact lens 12 rests on the bottom of the vessel. The vessel has a thick, transparent bottom 16. The vessel 10 is closed at its upper end by a stopper-like lid 18 which consists of a transparent material. The lid 18 has a head piece 20 that sits on the upper edge 22 of the vessel 10, and a stopper part 24 which projects into the vessel 10. Between the stopper part 24 and the inside wall 14 of the vessel 10, a gap 26 is formed. The vessel 10 is filled with a liquid 28, namely water. The liquid 28 wets the underside 30 of the lid 18 and rises slightly in the gap 26.

As indicated in FIG. 1, the vessel 10 is illuminated from above with directed illumination from an illumination device 32. The light passes through the transparent lid 18 and the liquid 28 onto the contact lens 12 to be inspected. The contact lens 12 is observed by an image-resolving sensor 34. For that purpose the contact lens 12 is imaged onto the sensor 34 by an imaging optical system 36. Optical defects in the contact lens cause scattering or deflection of the incident light. Those defects therefore appear dark in the image. The imaging by the imaging optical system 36 has a range of sharpness which is indicated in FIG. 1 by a double arrow 38. The face 30 of the lid 18 and the outer surface of the bottom 16 lie outside that range of sharpness 38. Those surfaces may have received scratches or the like during handling of the vessel or the lid 18. Such defects, however, are not "seen" sharply by the sensor 34 and cannot produce an illusion of defects in the contact lens 12 to be inspected. Owing to the fact that the face of the lid 18 is wetted by the liquid 28, the surface of the liquid in the direction of illumination is precisely defined. The surface cannot vary or form waves as a result of vibration or the movement of the vessel 10, which would make the inspection difficult.

Figure 2:
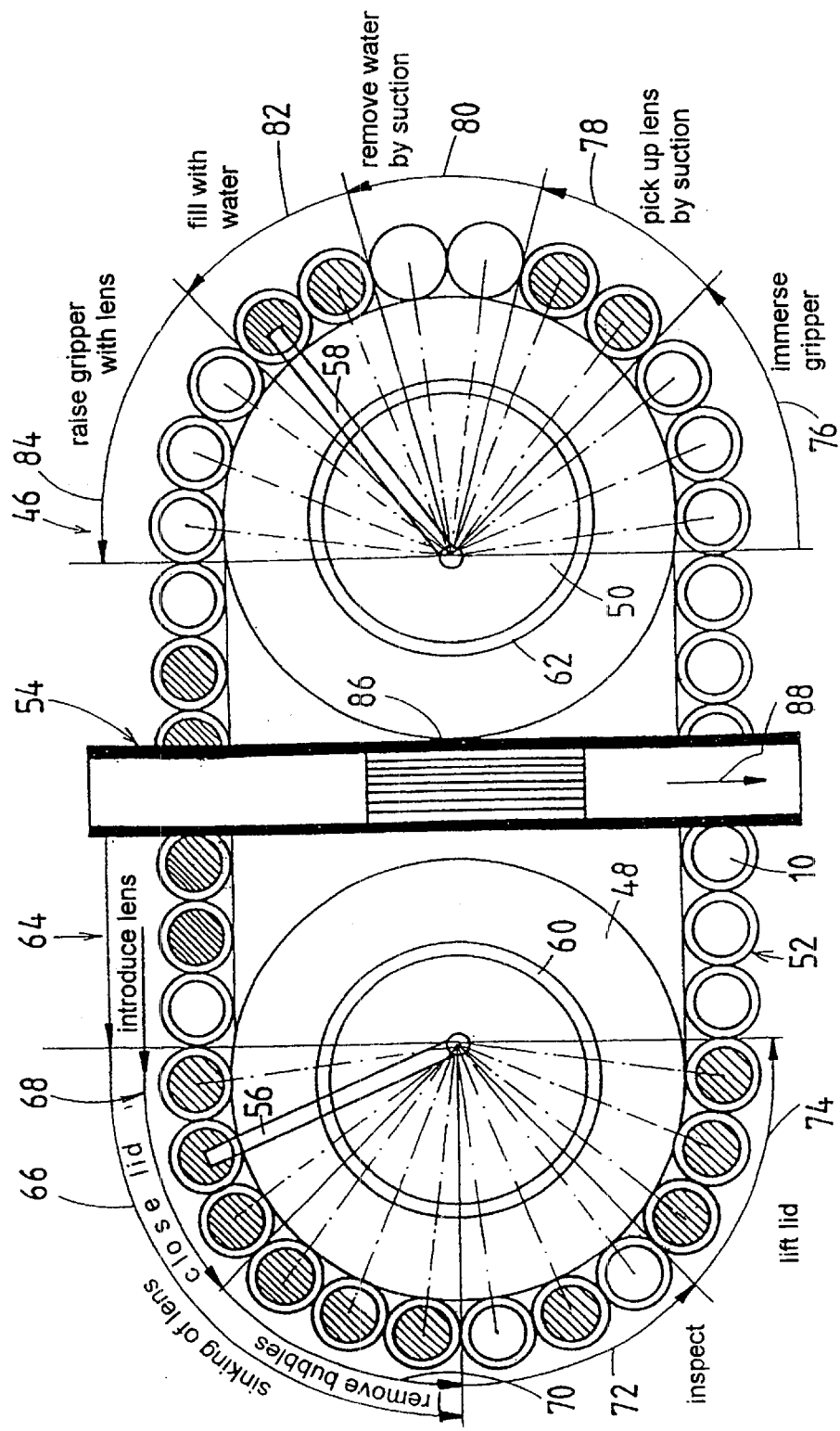
FIG. 2 is a schematic plan view of an inspection module.

In FIG. 2, reference numeral 46 denotes an inspection module in general. The inspection module 46 has two turntables 48 and 50 which are arranged at a distance from each other with axes parallel to each other. A chain 52 of vessels circulates around the turntables 48 and 50. The chain 52 of vessels consists of liquid-filled vessels 10 of the kind shown in FIG. 1, arranged in a row. The vessels 10 of the chain 52 of vessels move in an endless line around the two turntables 48 and 50. Arranged between the two turntables 48 and 50 is a conveying device 54 for supplying contact lenses to be inspected and for removing inspected contact lenses. The conveying device 54 extends above the chain 52 of vessels and at right angles to the straight sections of the chain 52 of vessels, which sections run between the turntables 48 and 50. The turntables 48 and 50 rotate continuously, that is to say, at a constant speed of revolution.

Handling means in the form of grippers 56 and 58 revolve likewise continuously with the turntables 48 and 50, respectively. For the sake of clarity, only one such gripper 56 and 58 in each case is shown in FIG. 2. The grippers 56 and 58 are actually arranged in the form of rays in such a manner that one such gripper 56 and 58 is situated above each of the vessels 10 of the chain 52 of vessels on the outer semi-circles of the turntables 48 and 50 and revolves with the vessel 10. On those outer semi-circles, therefore, there is no relative movement in the circumferential direction between the vessels 10 and the respective grippers 56 and 58. The grippers .56 and 58 are raised and lowered by cams 60 and 62, respectively. The cams 60 and 62 extend in a circle around the axis of rotation of the relevant turntables 48 and 50, respectively.

Over a straight "entry-side" section 64 of the chain 52 of vessels, contact lenses which have been supplied by means of the conveying device 54 are introduced into the vessels 10. Over a section 66 of the circuit of the vessels, they sink in the liquid to the bottom of the vessels 10, as shown in FIG. 1. In a section 68 of the circuit, the lid 18 (FIG. 1) is placed on the vessel 10 by the gripper 56 situated above the relevant vessel 10. For that purpose the gripper 56 is lowered by means of the cam 60. The gripper 56 has a suction head which picks up the lid 18 by suction, places it on the vessel 10 and then releases it. The gripper 56 can also be moved to the side of the vessel by cams (not shown) in order to free the upper opening of the vessel 10 for introduction of the contact lens 12 or for the measurement.

After the lid 18 has been placed on, the bubbles possibly adhering to the contact lens 12 to be inspected are removed in a section 70. That can be done by means of ultrasound and is not shown in detail here. At the exit from section 70, the contact lens 12 has sunk to the bottom of the vessel 10, the bubbles have been removed and the lid 18 has been placed on and its underside is wetted by the liquid.

In a following section 72, inspection of the contact lens takes place in the manner described with reference to FIG. 1. The gripper 56 is at that time moved by cam guidance out of the beam path of the illumination device 32.

In a section 74, the lid 18 is lifted off the vessel 10 again. For that purpose the gripper 56 is lowered onto the lid 18 again. The suction head picks up the lid by suction and then continues to lift it by the gripper 56 over the inner half of the turntable 48, around which half the chain 52 of vessels does not pass. After half a revolution of the turntable 48, in section 68, the gripper 56 then places the lid 18 again onto a new vessel 10 provided with a contact lens 12.

The vessel 10 without lid 18 then passes, in the lower straight section of the endless line shown in FIG. 2, to the second turntable 50.

Likewise revolving with the second turntable 50 are handling means in the form of grippers 58, only one of which is shown in FIG. 2 for the sake of clarity. The grippers extend in a star shape to the individual vessels 10 of the chain 52 of vessels and each revolves with one of the vessels 10 on the outer semi-circle remote from the turntable 48, remote in FIG. 2. The grippers 58 can be raised and lowered by the cams 62.

In a section 76, the grippers 58 are immersed in the vessels 10. In a section 78, the contact lenses 78 lying at the bottom of the vessels 10 are picked up by suction by means of suction heads fitted to the grippers 58.

Sections 80 and 82 serve for exchanging the liquid. In section 80, the liquid is removed by suction. In section 82, fresh liquid is introduced. That can be done by means of channels provided in the grippers 58. Finally, in a section 84, the grippers 58 together with the contact lenses 12 picked up by suction are lifted out of the vessels 10 by means of the cams 62.

The grippers 58 together with the contact lenses 12 picked up by suction then continue to move on the inner semi-circle of the turntable 50. The vessels 10 emptied of contact lenses 12 continue to move along the upper straight section of the endless line shown in FIG. 2 to the turntable 48. There, the described sequence is repeated. The grippers 58 set the inspected contact lenses down onto the conveying device 54 in a region 86. Those inspected contact lenses are then transported away by the conveying device as indicated by the arrow 88.

FIG. 3 shows schematically an inspection apparatus for contact lenses that comprises a plurality of inspection modules 46A, 46B, 46D, 46E and 46F of the kind shown in FIG. 2. Each of the inspection modules 46A, 46B, 46C, 46E and 46F is connected to an associated computer 90A, 90B, 90C, 90D, 90E and 90F, respectively. The computers 90A, 90B, 90C, 90D, 90E and 90F are connected in a network 92 to a server 94. For redundancy reasons, the network 92 advantageously also comprises a second server 94A. The network 92 is connected to a monitor 96 and an input keyboard 98. The network 92 can be connected via a data line 100 to a control centre, for example the manufacturer of the inspection apparatus, for remote diagnosis of any faults in the inspection apparatus.

What is claimed is:

1. An inspection module for inspecting optical parts for defects, having an inspection station and a succession of transport vessels circulating in an endless line which passes through the inspection station, wherein the inspection station comprises an illumination device, an image recognition sensor and means for image processing, the optical parts being illuminated from one side and being observed from the side lying opposite that side by means of an image-resolving sensor, and the image data of the sensor being forwarded to the image-processing means for identification of defects, wherein the optical parts are inspected directly in the transport vessels, wherein the transport vessels are open at the top, are filled with a liquid and are each closable by a transparent lid, wherein the transport vessels are closed by the transparent lid during passage through the inspection station in such a manner that the inside of the lid is wetted by the liquid, and wherein a handling means runs synchronously with each transport vessel, by means of which handling means each optical part to be inspected is introduced into a respective transport vessel at a position of the endless line upstream of the inspection station and the inspected part is taken out of the transport vessel at another position of the endless line.

2. An inspection module according to claim 1, wherein the transport vessels are cylindrical with a bottom consisting of a transparent material.

3. An inspection module according to claim 2, wherein the illumination device is so arranged at the inspection station that the transport vessels are illuminated from the lid end and the image recognition sensor is so arranged that the bottom can be observed.

4. An inspection module according to claim 3, wherein the inspection station comprises imaging optical means having a range of sharpness such that the optical part to be inspected lying on the inside of the bottom can be imaged onto the image recognition sensor.

5. An inspection module according to claim 4, wherein the transport vessels are so dimensioned that the thickness of the bottom and the distance between bottom and lid in the same way as the outside of the bottom lies outside the range of sharpness of the imaging optical means.

6. An inspection module according to claim 5, wherein means are provided for removing bubbles from the liquid before passage through the inspection station.

7. An inspection module according to claim 6, wherein the bubble-removing means operate with ultrasound.

8. An inspection module according to claim 7, wherein the endless line is formed by a chain of transport vessels arranged one behind another, which chain is passed around a first and a second turntable which are arranged at a certain distance from each other and have parallel axes of rotation.

9. An inspection module according to claim 8, wherein a first handling means for introducing the part to be inspected into the vessel and for carrying out the inspection revolves at the first turntable and a second handling means for taking out the inspected optical part revolves at the second turntable.

10. An inspection module according to claim 9, wherein the first handling means has a gripper for placing the lid on the vessel after introduction of the optical part to be inspected and for removing the lid after the inspection.

11. An inspection module according to claim 10, wherein the second handling means has a gripper, which gripper, in an entry region of the second turntable, is immersible in the liquid and grasps the optical part and, in an exit region of the second turntable, is movable out of the liquid together with the optical part.

12. An inspection module according to claim 11, wherein there is provided between the entry region (76) and the exit region (84) of the second turntable (50) a region for an exchange of liquid in which the liquid (28) can be removed from the vessels (10) by suction and replaced by new liquid.

13. An inspection module according to claim 12, wherein conveying means for supplying parts to be inspected and for removing inspected parts are arranged between the turntables.

14. An inspection module according to claim 13, wherein fixed cams are provided along the chain of vessels for the purpose of guiding the handling means.

15. An inspection module according to claim 14, wherein the liquid-filled vessels are driven continuously.

16. An inspection apparatus for inspecting optical parts for defects, comprising a plurality of inspection modules, wherein each inspection module is connected by a respective computer to a network having a common server and includes an inspection station and a succession of transport vessels circulating in an endless line which passes through the inspection station, wherein the inspection station comprises an illumination device, an image recognition sensor and means for image processing, the optical parts being illuminated from one side and being observed from the side lying opposite that side by means of an image-resolving sensor, and the image data of the sensor being forwarded to the image-processing means for identification of defects, wherein the optical parts are inspected directly in the transport vessels, wherein the transport vessels are open at the top, are filled with a liquid and are each closable by a transparent lid, wherein the transport vessels are closed by the transparent lid during passage through the inspection station in such a manner that the inside of the lid is wetted by the liquid, and wherein a handling means runs synchronously with each transport vessel, by means of which handling means each optical part to be inspected is introduced into a respective transport vessel at a position of the endless line upstream of the inspection station and the inspected part is taken out of the transport vessel at another position of the endless line.

17. The inspection apparatus of claim 16, wherein the endless line is formed by a chain of transport vessels arranged one behind another, wherein the chain is passed around a first and a second turntable which are arranged at a certain distance from each other and have parallel axes of rotation.

18. The inspection apparatus of claim 17, wherein a first handling means for introducing the part to be inspected into the vessel and for carrying out the inspection revolves at the first turntable and a second handling means for taking out the inspected optical part revolves at the second turntable.

19. The inspection apparatus of claim 18, wherein the first handling means has a gripper for placing the lid on the vessel after introduction of the optical part to be inspected and for removing the lid after the inspection.

20. The inspection apparatus of claim 19, wherein the second handling means has a gripper which, in an entry region of the second turntable, is immersible in the liquid and grasps the optical part and, in an exit region of the second turntable, is movable out of the liquid together with the optical part.

* * * * *